US012665930B2

(12) United States Patent
Radhakrishnan et al.

(10) Patent No.: US 12,665,930 B2
(45) Date of Patent: Jun. 23, 2026

(54) SYSTEMS AND METHODS FOR DYNAMIC POLICY ASSIGNMENT OF SECURE COMMUNICATION SESSIONS USING SPDM

(71) Applicant: Dell Products, L.P., Round Rock, TX (US)

(72) Inventors: Vineeth Radhakrishnan, Palakkad (IN); Mini Thottunkal Thankappan, Bangalore (IN); Shinose Abdul Rahiman, Bangalore (IN); Rama Rao Bisa, Bangalore (IN); Dharma Bhushan Ramaiah, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 215 days.

(21) Appl. No.: 18/177,153

(22) Filed: Mar. 2, 2023

(65) Prior Publication Data

US 2024/0297902 A1     Sep. 5, 2024

(51) Int. Cl.
*H04L 9/40*          (2022.01)

(52) U.S. Cl.
CPC .......... *H04L 63/20* (2013.01); *H04L 63/0428* (2013.01)

(58) Field of Classification Search
CPC ............................ H04L 63/20; H04L 63/0428
USPC ........................................................ 713/189
See application file for complete search history.

(56) References Cited

U.S. PATENT DOCUMENTS

| | | | | |
|---|---|---|---|---|
| 6,067,620 A | * | 5/2000 | Holden | H04L 63/0218 |
| | | | | 713/168 |
| 6,378,026 B1 | * | 4/2002 | Chan | G06F 13/4072 |
| | | | | 713/323 |
| 6,836,548 B1 | * | 12/2004 | Anderson | G06F 21/73 |
| | | | | 713/168 |
| 7,028,332 B1 | * | 4/2006 | Jason, Jr. | H04L 63/20 |
| | | | | 713/153 |
| 7,739,739 B2 | * | 6/2010 | Dettinger | H04L 63/145 |
| | | | | 713/169 |
| 10,469,465 B2 | * | 11/2019 | Stuntebeck | H04L 63/1408 |
| 10,986,052 B1 | * | 4/2021 | Wanek | H04L 12/1822 |
| 11,354,259 B1 | * | 6/2022 | Hilland | G06F 9/4406 |
| 2012/0096540 A1 | * | 4/2012 | Hilgenkamp | H04L 12/4641 |
| | | | | 726/15 |
| 2015/0237021 A1 | * | 8/2015 | Sovio | G06F 16/951 |
| | | | | 713/168 |
| 2015/0304329 A1 | * | 10/2015 | Yan | H04L 63/10 |
| | | | | 726/27 |
| 2022/0179961 A1 | * | 6/2022 | Yao | G06F 21/85 |

(Continued)

*Primary Examiner* — Dant B Shaifer Harriman
(74) *Attorney, Agent, or Firm* — Fogarty LLP

(57)          ABSTRACT

According to embodiments of the present disclosure, an Information Handling System (IHS) includes systems and methods for dynamic policy assignment of secure communication using a Security Protocol and Data Model (SPDM). The IHS includes a first SPDM-enabled device conforming to a SPDM specification that receives a request to transmit data to a second SPDM-enabled device, obtains one or more policies associated with a corresponding one or more transmission criteria of the first SPDM-enabled device relative to the second SPDM-enabled device, and determines whether the data is to be encrypted based upon whether a transmission of the data meets the transmission criteria. Based upon the determination, the first SPDM-enabled device encrypts the data prior to transmitting the data to the second SPDM-enabled device.

14 Claims, 4 Drawing Sheets

—300

| SL NO | SIZE | REQUESTER/RESPONDER WITHIN TRUST BOUNDARY | DEFAULT ENCRYPTION SETTING* |
|---|---|---|---|
| 1 | LESS THAN THRESHOLD | WITHIN TRUST BOUNDARY | NO |
| 2 | LESS THAN THRESHOLD | OUTSIDE TRUST BOUNDARY | YES |
| 3 | GREATER THAN THRESHOLD | WITHIN TRUST BOUNDARY | YES |
| 4 | GREATER THAN THRESHOLD | OUTSIDE TRUST BOUNDARY | YES |

302A   302B   302C   302D

(56) References Cited

U.S. PATENT DOCUMENTS

| 2023/0043229 A1* | 2/2023 | Tola ..................... H04L 9/0841 |
| 2023/0084085 A1* | 3/2023 | Zacks .................. H04W 88/08 |
| | | 726/3 |

* cited by examiner

100

102 CPU

104

110 GIGABIT ETHERNET

112 ON-BOARD GRAPHICS

NORTH BRIDGE

106

MAIN MEMORY 114

108

116 USB PORTS

118 GPIO PINS

120 SERIAL ATA PORTS

122 ATA100 PORTS

124 SOUND ADAPTER

SOUTH BRIDGE

POWER MANAGEMENT 126

PCIe BUS

CLOCK GENERATION 128

PCIe SLOT 130

BMC 132

ETHERNET CONTROLLER 134

136 BIOS FIRMWARE

140 SPI NATIVE NVRAM

137 VIRTUAL NVRAM

SSD/NVMe

138 SUPER I/O DEVICE

┌─300

| | 302A | 302B | 302C | 302D |

| SL NO | SIZE | REQUESTER/RESPONDER WITHIN TRUST BOUNDARY | DEFAULT ENCRYPTION SETTING* |
|---|---|---|---|
| 1 | LESS THAN THRESHOLD | WITHIN TRUST BOUNDARY | NO |
| 2 | LESS THAN THRESHOLD | OUTSIDE TRUST BOUNDARY | YES |
| 3 | GREATER THAN THRESHOLD | WITHIN TRUST BOUNDARY | YES |
| 4 | GREATER THAN THRESHOLD | OUTSIDE TRUST BOUNDARY | YES |

400

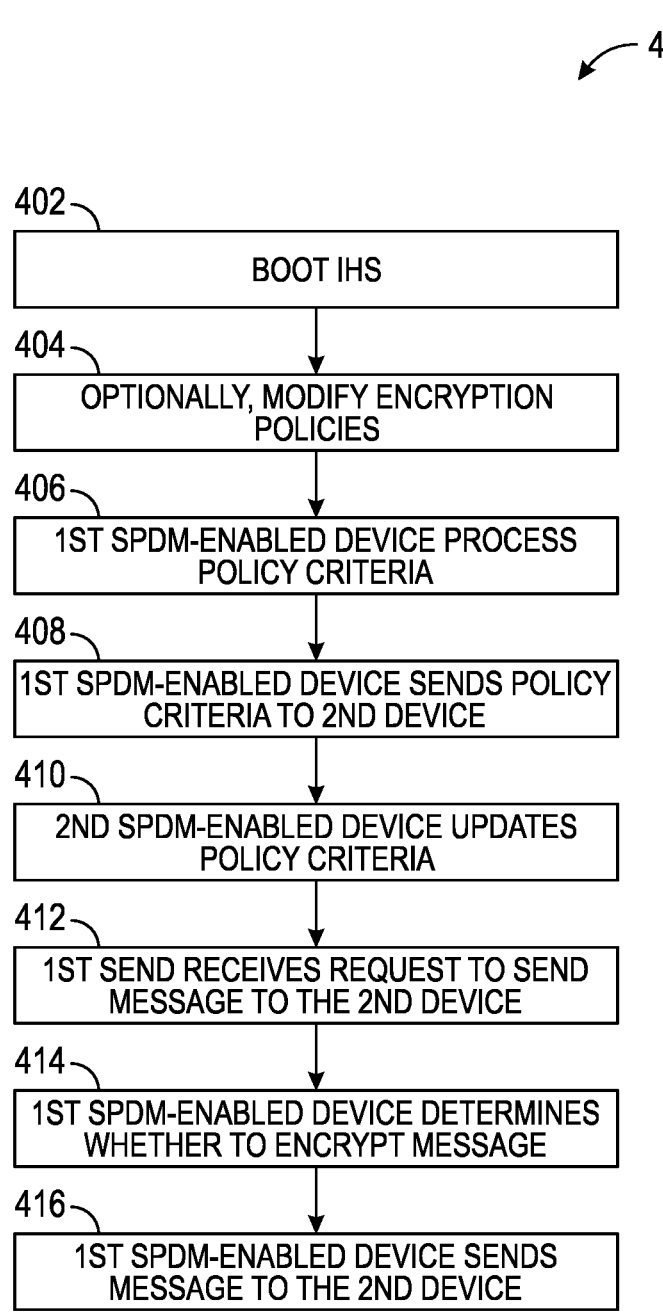

402 — BOOT IHS

404 — OPTIONALLY, MODIFY ENCRYPTION POLICIES

406 — 1ST SPDM-ENABLED DEVICE PROCESS POLICY CRITERIA

408 — 1ST SPDM-ENABLED DEVICE SENDS POLICY CRITERIA TO 2ND DEVICE

410 — 2ND SPDM-ENABLED DEVICE UPDATES POLICY CRITERIA

412 — 1ST SEND RECEIVES REQUEST TO SEND MESSAGE TO THE 2ND DEVICE

414 — 1ST SPDM-ENABLED DEVICE DETERMINES WHETHER TO ENCRYPT MESSAGE

416 — 1ST SPDM-ENABLED DEVICE SENDS MESSAGE TO THE 2ND DEVICE

FIG. 4

SYSTEMS AND METHODS FOR DYNAMIC POLICY ASSIGNMENT OF SECURE COMMUNICATION SESSIONS USING SPDM

BACKGROUND

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, global communications, etc. In addition, IHSs may include a variety of hardware and software components that may be configured to process, store, and communicate information and may include one or more computer systems, data storage systems, and networking systems.

Communication networks, and in particular the Internet, has revolutionized the manner in which software is updated on a computer system. Prior to the advent of the Internet, a software provider would package the update on computer readable media, and the computer owner had to obtain a copy of the media to complete the update in order to make the software update accessible to the user of the computer system. However, distributing software updates on computer readable media was often expensive for software providers, which tended to restrict the number of software updates that a software provider would issue. As a consequence, substantial time would pass between updates, and consumers had to manage certain known issues for these time periods, at least until an update became available. Another aspect of this older method was that many modifications were packaged into a single update to reduce the costs associated with distributing the update.

SPDM-based attestation, which has been published by the Platform Management Components Intercommunication (PMCI) Working Group of the Distributed Management Task Force (DMTF), generally involves a security mechanism to remotely detect an adversarial presence on a device to guarantee the device's trustworthiness. Attestation runs as a two-party security scheme in which a trusted party (e.g., the requesting device) assures the integrity of the untrusted remote device (e.g., the responding device). A requesting device, using this scheme, can determine the identity of a device and/or the firmware/software that the device is running. The responding device may send proof about its current state using a cryptographic hash to the requesting device. The requesting device may then evaluate the received evidence with the expected legitimate state of the responding device, and validate whether or not the responding device is trustworthy or not. Many system-on-chip (SOC) platforms now use SPDM-based attestation due in large part, to its light weight.

SUMMARY

According to embodiments of the present disclosure, an Information Handling System (IHS), systems and methods for dynamic policy assignment of secure communication using Security Protocol and Data Model (SPDM) are disclosed. An Information Handling System (IHS) includes a first SPDM-enabled device conforming to a SPDM specification, receives a request to transmit data to a second SPDM-enabled device, obtain one or more policies associated with a corresponding one or more transmission criteria of the first SPDM-enabled device relative to the second SPDM-enabled device, and determine whether the data is to be encrypted based upon whether a transmission of the data meets the transmission criteria. Based upon the determination, encrypt the data prior to transmitting the data to the second SPDM-enabled device.

According to another embodiment, a dynamic policy assignment method includes the steps of receiving, by a first SPDM-enabled device, a request to transmit data to a second SPDM-enabled device, and obtaining, by the first SPDM-enabled device, one or more policies associated with a corresponding one or more transmission criteria of the first SPDM-enabled device relative to the second SPDM-enabled device. The method further includes the steps of determining, by the first SPDM-enabled device, whether the data is to be encrypted based upon whether a transmission of the data meets the transmission criteria, and based upon the determination, encrypting, by the first SPDM-enabled device, the data prior to transmitting the data to the second SPDM-enabled device.

According to yet another embodiment, a computer program product is included with executable instructions to, by an IHS, receive a request to transmit data to a second SPDM-enabled device, obtain one or more policies associated with a corresponding one or more transmission criteria of a first Security Protocol and Data Model (SPDM)-enabled device relative to the second SPDM-enabled device, determine whether the data is to be encrypted based upon whether a transmission of the data meets the transmission criteria, and based upon the determination, encrypt the data prior to transmitting the data to the second SPDM-enabled device.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

FIG. 4 illustrates an example dynamic policy assignment method showing how messages between a first SPDM-enabled device and a second SPDM-enabled device may be dynamically encrypted according to one embodiment of the present disclosure.

DETAILED DESCRIPTION

Figure 1:
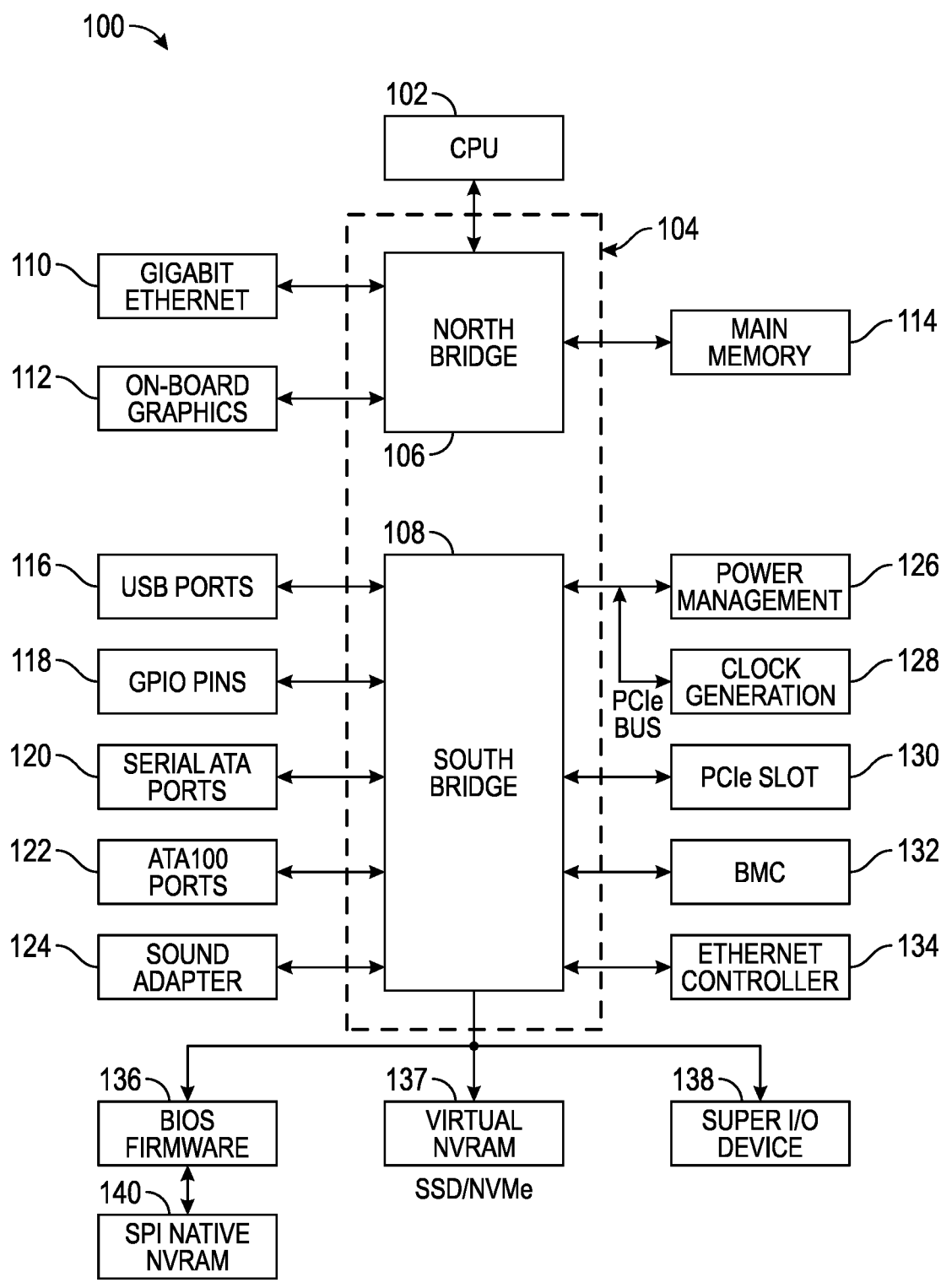
FIG. 1 shows an example of an Information Handling System (IHS) that may be configured to implement a system and method for dynamic policy assignment using SPDM according to one embodiment of the present disclosure.

The present disclosure is described with reference to the attached figures. The figures are not drawn to scale, and they are provided merely to illustrate the disclosure. Several aspects of the disclosure are described below with reference to example applications for illustration. It should be understood that numerous specific details, relationships, and methods are set forth to provide an understanding of the disclosure. The present disclosure is not limited by the illustrated ordering of acts or events, as some acts may occur in different orders and/or concurrently with other acts or events. Furthermore, not all illustrated acts or events are required to implement a methodology in accordance with the present disclosure.

For purposes of this disclosure, an Information Handling System (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources such as a Central Processing Unit (CPU) or hardware or software control logic, Read-Only Memory (ROM), and/or other types of nonvolatile memory. Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components. An example of an IHS is described in more detail below.

Certain IHSs may be configured with Baseboard management controllers (BMCs) that are used to monitor, and in some cases manage computer hardware components of their respective IHSs. A BMC is normally programmed using a firmware stack that configures the BMC for performing out-of-band (e.g., external to a computer's operating system or BIOS) hardware management tasks. The BMC firmware can support industry-standard Specifications, such as the Intelligent Platform Management Interface (IPMI) and Systems Management Architecture of Server Hardware (SMASH) for computer system administration.

Various standards have been proposed to more effectively interconnect and operate PCIe devices. These include the specialization of communication standards distributed by groups such as the Institute of Electrical and Electronics Engineers (IEEE), and those that specify security requirements and approaches for IoT and distributed device settings are also being proposed by the Trusted Computing Group (TCG). The Distributed Management Task Force (DMTF), for example, defines a standard to allow cryptographic authentication of devices in a computer system that may be referred to as a Security Protocol and Data Model (SPDM). These security contexts are enabled through the use of various hardware components with security approaches enabled by a Trusted Computing Group (TCG) Device Identifier Composition Engine (DICE) implementation.

BMCs are particularly well suited for the features provided by the SPDM specification. The SPDM specification has been published by the Platform Management Components Intercommunication (PMCI) Working Group of the Distributed Management Task Force (DMTF). A particular goal of the SPDM specification is to facilitate secure communication among the devices of a platform management subsystem. Examples of a platform management subsystem may include an Information Handling System (IHS), such as a desktop computer, laptop computer, a cellular telephone, a server, and the like.

The SPDM specification defines messages and procedures for secure communication among hardware devices, which includes authentication of hardware devices and session key exchange protocols to provide secure communication among those hardware devices. Management Component Transport Protocol (MCTP) Peripheral Component Interconnect Express (PCIe) vendor defined message (VDM) channels, which supports peer-to-peer messaging (e.g., route by ID), allow a SPDM-enabled hardware device to issue commands to other SPDM-enabled hardware devices within a secure communication channel.

Cyber attackers are reportedly exploiting and abusing devices, such as platform interface protocol analyzers to steal unencrypted information, spy on network traffic, and gather information to leverage in future attacks against platform components and component interfaces (e.g., I2C, PCIe, I3C, Sensewire, SPI, etc.) of an IHS. Detection of vulnerable platform components is not an easy task, and exploiting unpatched vulnerabilities could allow the attacker to take control of the IHS. Some example platform security risks may include compromised security in which hostile component insertion and/or compromised firmware updates can cause supply chain security issues. Another example platform security risk may include confidentiality and integrity risks in which data transfers that are unencrypted may be vulnerable to eavesdropping, stealing, and tampering. Additionally, non-compliant security configuration errors, certificate management, platform security trust, and the like could lead to non-compliance with industry standard security policies. The DMTF SPDM specifications have been developed to alleviate such problems and reduce management overhead in maintaining and establishing the platform security within the IHS infrastructure domain.

The SPDM model provides a technique to attest another device and establish a secure channel for communication. The secure channel may, for example, be used by a BMC to exchange critical data with the other device. While SPDM may provide a secure channel for data encryption, it does not define policies for data encryption. The decision or policies used to encrypt the traffic is left to implementers. Conventionally, any decision to encrypt is hardcoded and is mostly based on particular use cases (e.g., SEKM Key exchange). There has however been no technique whereby the BMC, or some other SPDM-enabled device can encrypt the traffic dynamically.

Recent implementations in IHSs, such as servers, workstations, notebook computers, cellular telephones, and the like, have adopted a modular hardware approach where multiple modular hardware modules (including PCIe cards) are combined in various combinations to create a server configuration. As a result, critical data may be compromised by intercommunication between the modules that often leave the BMC/planar/chassis, thus rendering enhanced opportunities for intercepting (e.g., snooping) of the critical data.

As will be described in detail herein below, embodiments of the present disclosure provide a system and method for dynamic policy assignment of secure communication sessions using SPDM. In one embodiment, systems and methods may provide for message based policies to be applied for determining whether a message should be encrypted on a message-by-message basis. In this manner, messages and the data included in those messages may be alleviated of congestion that could occur when all messaging is required to be encrypted, while maintaining security for critical data that is susceptible for transmissions involving inherently insecure communication links.

FIG. 1 shows an example of an IHS 100 that may be configured to implement embodiments described herein. It should be appreciated that although certain embodiments described herein may be discussed in the context of a desktop or server computer, other embodiments may be utilized with virtually any type of IHS 100. Particularly, the IHS 100 includes a baseboard or motherboard, to which is a printed circuit board (PCB) to which components or devices are mounted by way of a bus or other electrical communication path. For example, Central Processing Unit (CPU) 102 operates in conjunction with a chipset 104. CPU 102 is a processor that performs arithmetic and logic necessary for the operation of the IHS 100.

Chipset 104 includes northbridge 106 and southbridge 108. Northbridge 106 provides an interface between CPU 102 and the remainder of the IHS 100. Northbridge 106 also provides an interface to a random access memory (RAM) used as main memory 114 in the IHS 100 and, possibly, to on-board graphics adapter 112. Northbridge 106 may also be configured to provide networking operations through Ethernet adapter 110. Ethernet adapter 110 is capable of connecting the IHS 100 to another IHS (e.g., a remotely located IHS) via a network. Connections which may be made by Ethernet adapter 110 may include local area network (LAN) or wide area network (WAN) connections. Northbridge 106 is also coupled to southbridge 108.

Southbridge 108 is responsible for controlling many of the input/output (I/O) operations of the IHS 100. In particular, southbridge 108 may provide one or more universal serial bus (USB) ports 116, sound adapter 124, Ethernet controller 134, and one or more general purpose input/output (GPIO) pins 118. Southbridge 108 may also provide a bus for interfacing peripheral card devices such as PCIe slot 130. In some embodiments, the bus may include a peripheral component interconnect (PCI) bus. Southbridge 108 may also provide baseboard management controller (BMC) 132 for use in managing the various components of the IHS 100. Power management circuitry 126 and clock generation circuitry 128 may also be utilized during operation of southbridge 108.

Additionally, southbridge 108 is configured to provide one or more interfaces for connecting mass storage devices to the IHS 100. For instance, in an embodiment, southbridge 108 may include a serial advanced technology attachment (SATA) adapter for providing one or more serial ATA ports 120 and/or an ATA100 adapter for providing one or more ATA100 ports 122. Serial ATA ports 120 and ATA100 ports 122 may be, in turn, connected to one or more mass storage devices storing an operating system (OS) and application programs.

An OS may comprise a set of programs that controls operations of the IHS 100 and allocation of resources. An application program is software that runs on top of the OS and uses computer resources made available through the OS to perform application-specific tasks desired by the user.

Mass storage devices connected to southbridge 108 and PCIe slot 130, and their associated computer-readable media provide non-volatile storage for the IHS 100. Although the description of computer-readable media contained herein refers to a mass storage device, such as a hard disk or CD-ROM drive, it should be appreciated by a person of ordinary skill in the art that computer-readable media can be any available media on any memory storage device that can be accessed by the IHS 100. Examples of memory storage devices include, but are not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices.

A low pin count (LPC) interface may also be provided by southbridge 108 for connecting Super I/O device 138. Super I/O device 138 is responsible for providing a number of I/O ports, including a keyboard port, a mouse port, a serial interface, a parallel port, and other types of input/output ports.

The LPC interface may connect a computer storage media such as a ROM or a flash memory such as a non-volatile random access memory (NVRAM) for storing BIOS/firmware 136 that includes BIOS program code containing the basic routines that help to start up the IHS 100 and to transfer information between elements within the IHS 100. BIOS/firmware 136 comprises firmware compatible with the Extensible Firmware Interface (EFI) Specification and Framework.

The LPC interface may also be utilized to connect virtual NVRAM 137 (e.g., SSD/NVMe) to the IHS 100. The virtual NVRAM 137 may be utilized by BIOS/firmware 136 to store configuration data for the IHS 100. In other embodiments, configuration data for the IHS 100 may be stored on the same virtual NVRAM 137 as BIOS/firmware 136. The IHS 100 may also include a SPI native NVRAM 140 coupled to the BIOS 136.

BMC 132 may include non-volatile memory having program instructions stored thereon that enable remote management of the IHS 100. For example, BMC 132 may enable a user to discover, configure, and manage the IHS 100, setup configuration options, resolve and administer hardware or software problems, etc. Additionally or alternatively, BMC 132 may include one or more firmware volumes, each volume having one or more firmware files used by the BIOS' firmware interface to initialize and test components of the IHS 100.

As a non-limiting example of BMC 132, the integrated DELL Remote Access Controller (iDRAC) from DELL, INC. is embedded within DELL POWEREDGE servers and provides functionality that helps information technology (IT) administrators deploy, update, monitor, and maintain servers with no need for any additional software to be installed. The iDRAC works regardless of OS or hypervisor presence from a pre-OS or bare-metal state because iDRAC is embedded within the IHS 100 from the factory.

It should be appreciated that, in other embodiments, the IHS 100 may comprise other types of computing devices, including hand-held computers, embedded computer systems, personal digital assistants, and other types of computing devices. It is also contemplated that the IHS 100 may not include all of the components shown in FIG. 1, may include other components that are not explicitly shown in FIG. 1, or may utilize a different architecture.

According to embodiments of the present disclosure, the IHS 100 may support SPDM in which the BMC 132 manages the operation of one or more managed devices configured in the IHS 100. The SPDM specification provides for secure communication between the BMC 132 and the managed devices in the IHS 100. To meet this goal, the SPDM specification facilitates certificate chains that are stored in up to eight slots. Slot 0 is a default slot that is always used, while the other slots (e.g., slots 1-7) may be allocated for use by the administrator of the IHS 100. The SPDM spec also provides a slot mask that identifies each certificate chain.

Figure 2:
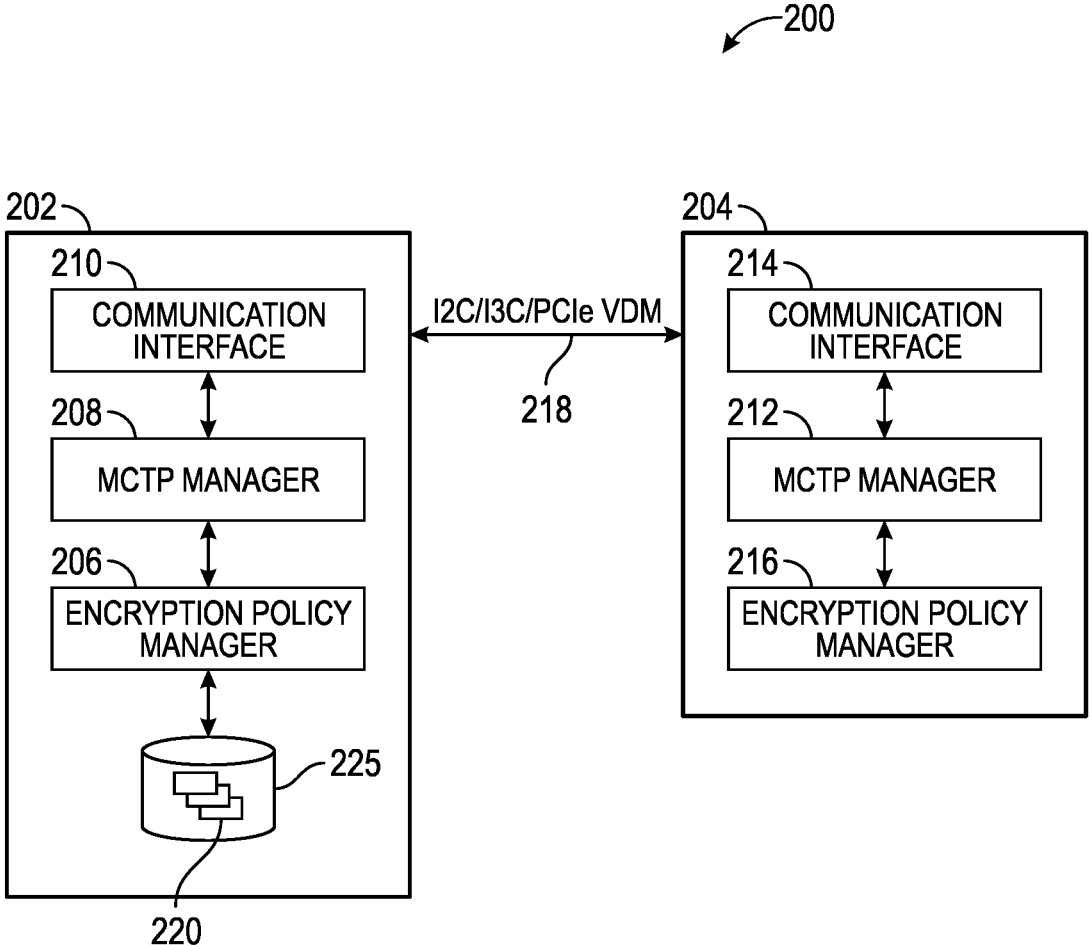
FIG. 2 illustrates an example dynamic policy assignment system for secure communication sessions according to one embodiment of the present disclosure.

FIG. 2 illustrates an example dynamic policy assignment system 200 for secure communication sessions according to one embodiment of the present disclosure. The dynamic policy assignment system 200 includes a first SPDM-enabled device 202 and a second SPDM-enabled device 204. The first SPDM-enabled device 202 includes an encryption policy manager 206, a MCTP manager 208, and a communication interface 210, while the second SPDM-enabled device 204, on the other hand, includes a MCTP manager 212, a communication interface 214, and an encryption policy manager 216. The communication interface 210 of the first SPDM-enabled device 202 communications with the communication interface 214 of the second SPDM-enabled device 204 using a communication link 218. The communication link 218 may function according to any suitable format capable of SPDM messaging, such as an I2C protocol, an I3C SENSEWIRE protocol, a SPI protocol, and a PCIe VDM channel.

In one embodiment, the first SPDM-enabled device 202 can be considered to be a hub that manages secure communications with multiple second SPDM-enabled devices 204. For example, the first SPDM-enabled device 202 may be a BMC 132 that provides secure communications with multiple second SPDM-enabled devices 204 of an IHS 100. As another example, the first SPDM-enabled device 202 may be one of multiple SPDM-enabled devices of an IHS 100 that provides secure communications with a second SPDM-enabled device 204 embodied as a BMC 132 configured in the IHS 100.

The encryption policy manager 206 may create appropriate headers for the MCTP manager 208 to transmit the packets. In one embodiment, the encryption policy manager 206 may transmit one or more policies associated with whether the messages are encrypted to the MCTP manager 212 at the remotely configured SPDM-enabled device 204 so that the 2-way communication (e.g., both directions) between the first and second SPDM-enabled device 202, 204 is performed at the same level of encryption.

The first and second communication interfaces 210, 214 of each SPDM-enabled device 202, 204 transmit and receive messages in the form of packets, while the MCTP manager 208, 212 may aggregate the packets received by their respective communication interfaces 210, 214 to frame a complete message at the receiving endpoint. In general, each MCTP manager 208, 212 uses a management component transport protocol (MCTP) for packetizing messages at the transmitting SPDM-enabled device 202, 204, and de-packetizing messages at the receiving SPDM-enabled device 202, 204. In one embodiment, the MCTP manager 208 may generate and include a sequence number for each packet so that the message can be re-constructed by each MCTP manager 208, 212 at the remote SPDM-enabled device 202, 204.

The encryption policy manager 206 defines the behavior of the secure message transmission based upon whether data is encrypted or not through the communication link 218. To this end, the encryption policy manager 206 may store and access one or more encryption policies 220 stored in a database 225, or other suitable type of storage medium in which each policy 220 may be based upon a particular criterion that the encryption policy manager 206 uses to decide whether to encrypt each message sent over the communication link 218.

One particular criterion may include a size of a message (e.g., request message) sent between the first SPDM-enabled device 202 and the second SPDM-enabled device 204. For example, if the next message to be sent from the first SPDM-enabled device 202 has a size (e.g., 17.6 Megabytes) above a threshold value (e.g., 10 MegaBytes), the encryption policy manager 206 may instruct the MCTP manager 208 to encrypt that message. Conversely, if the next message to be sent from the first SPDM-enabled device 202 has a size (e.g., 2.4 Megabytes) less than the threshold value (e.g., 10 MegaBytes), the encryption policy manager 206 may instruct the MCTP manager 208 to not encrypt that message. The size criterion may be stored as a policy 220 in the database 225.

Critical data that is sent from a BMC 132 is usually large in size compared to other data, such as polling commands and inventory commands (e.g., SEKM Key exchange) data. Usually, the BMC 132 requests to the devices for fetching data and polling requests utilizes data that is typically small in size. Thus, characterizing the size of messages may be useful for determining whether to encrypt messages sent from the first SPDM-enabled device 202 (e.g., BMC 132).

Another particular criterion may include a hardware topology of the first SPDM-enabled device 202 relative to the second SPDM-enabled device 204. For example, devices on the mother board may be considered to be within a trust boundary because it can be relatively difficult to sniff (e.g., snoop) messages exchanged between devices that may be both configured on the mother board. For example, a BMC 132 and a CPU 102 may be considered to be within a common trust boundary because they are both configured on a common mother board, while a Just a Bunch of Disk (JBOD) structure, a backplane, and/or a PSU may be considered to be outside the trust boundary because they are separate from the mother board.

While a message size and hardware topology criteria are cited as viable criteria, it should be appreciated that other types of criteria may be used for determining whether to encrypt messages between the first SPDM-enabled device 202 and second SPDM-enabled device 204. For example, the encryption policy manager 206 may use the type of communication link 218 (e.g., I2C, I3C, SPI, PCIe VDM, etc.) or a type of SPDM-enabled device 204 (e.g., NIC card, CPU, GPU, on-board graphics card, GPIO card, etc.) for determining whether to encrypt messages conveyed between the first SPDM-enabled device 202 and second SPDM-enabled device 204.

Each policy 220 may possess a default setting that may be manually changed by a user, by another process running on the first SPDM-enabled device 202 or other component running on the IHS 100. For example, the size policy may have a default setting of 10.0 Megabytes, and can be changed by a user to any desired value (e.g., 2.0 Megabytes). Additionally, the trust boundary may have a default setting of determining the trust boundary due to both SPDM-enabled devices 202, 204 sharing a common mother board, and can be manually changed to determining the trust boundary due to both SPDM-enabled devices 202, 204 sharing a common IHS 100.

Figure 3:
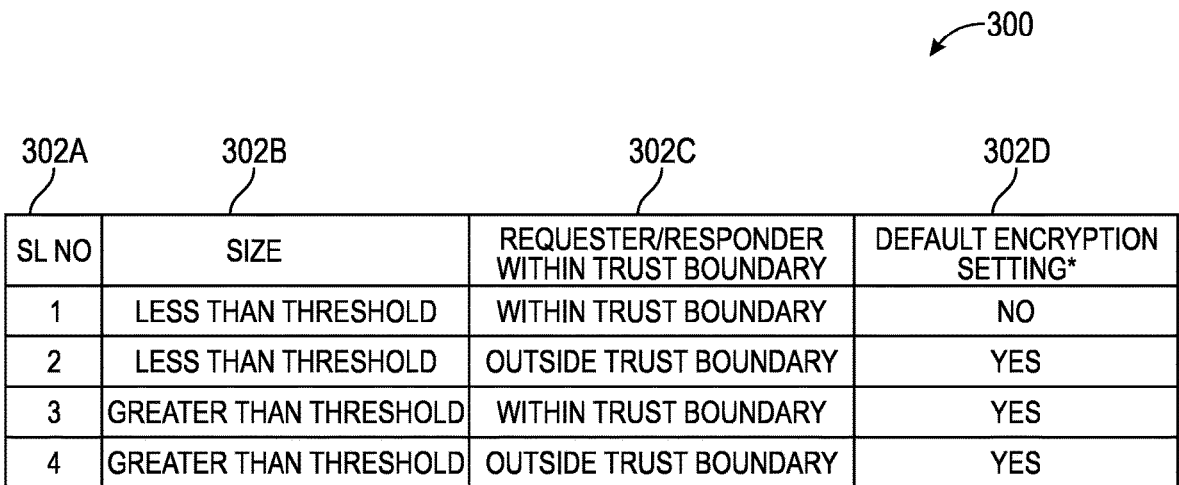
FIG. 3 illustrates an example truth table showing how several criteria may be logically combined by the encryption policy manager for determining whether to encrypt messages sent to the second SPDM-enabled device according to one embodiment of the present disclosure.

FIG. 3 illustrates an example truth table 300 showing how several criteria may be logically combined by the encryption policy manager 206 for determining whether to encrypt messages sent to the second SPDM-enabled device 204 according to one embodiment of the present disclosure. The truth table 300 include several columns including a first column 302a identifying a reference number for each of multiple conditions, a second column 302b indicating a size of message, a third column 302*c* indicating a trust boundary, and a fourth column 302*d* indicating a default setting for each of the individual conditions. For example, if the next message to be sent has a size less than a threshold value (e.g., 10 Megabytes), and the second SPDM-enabled device 204 is within the trust boundary, than the message will not be encrypted. For all other combined conditions (e.g., 2-4), however, the message will be encrypted. Thus, the truth table 300 shows how the criteria may be used in combination for determining whether to encrypt the next message sent by the first SPDM-enabled device 202. It should be noted that while each combined condition has a default encryption setting as shown in column 302*d*, it can be modified manually by a user, by a process, by another process running on the first SPDM-enabled device 202, or by another component running on the IHS 100.

FIG. 4 illustrates an example dynamic policy assignment method 400 showing how messages between a first SPDM-enabled device 202 and a second SPDM-enabled device 204 may be dynamically encrypted according to one embodiment of the present disclosure. Additionally or alternatively, the dynamic policy assignment method 400 may be performed at least in part, by the system 200 as described herein above with reference to FIG. 2. The first and second SPDM-enabled device 202, 204 may include any type that are capable of communicating using SPDM. In one embodiment, the first SPDM-enabled device 202 may be a BMC 132 that manages the operation of the second SPDM-enabled device 204, which may, for example, be configured in the same IHS 100 in which the BMC 132 is configured.

Initially at step 402, the IHS 100 is booted. Once booted, the encryption policies may optionally be modified at step 404. At step 406, the first SPDM-enabled device 202 processes the encryption policies. For example, the encryption policy manager 206 configured in the first SPDM-enabled device 202 may load the encryption policies 220 from storage 225 so that appropriate triggers may be set in resident memory. Thereafter at step 408, the first SPDM-enabled device 202 sends the policies 220 to the second SPDM-enabled device 204. This step is performed so that the second SPDM-enabled device 204 will be aware of whether a received message is encrypted or not, and so that it may apply the same policies for sending other messages to the first SPDM-enabled device 202. At step 410, the second SPDM-enabled device 204 updates the encryption policy criteria. For example, the encryption policy manager 216 configured in the second SPDM-enabled device 204 may load the received encryption policies in resident memory and set appropriate triggers.

At step 412, the first SPDM-enabled device 202 receives a request to send a message to the second SPDM-enabled device 204. For example, the MCTP manager 208 may receive a message to be sent from another process running on the first SPDM-enabled device 202, and load the message in a buffer. At step 414, the first SPDM-enabled device 202 then determines whether to encrypt the message. For example, the first SPDM-enabled device 202 may determine a size of the message, and determine whether to encrypt the message according to a threshold size value obtained from one of the policies 220. For another example, the first SPDM-enabled device 202 may identify an intended recipient of the message and determine whether that device lies within an established trust boundary (e.g., same mother board). Thereafter at step 416, the first SPDM-enabled device 202 sends the message to the second SPDM-enabled device 204.

Steps 412-416 may be repeatedly performed for each message sent to the second SPDM-enabled device 204. While the steps above were described in terms of a single second SPDM-enabled device 204, it should be appreciated that the steps of the dynamic policy assignment method 400 may be applied to multiple second SPDM-enabled devices 204 that the first SPDM-enabled device 202 is configured to send messages to. Nevertheless, when use of the dynamic policy assignment method 400 is no longer needed or desired, the process ends.

Although FIG. 4 describes an example method 400 that may be performed to dynamically encrypt messages sent from a first SPDM-enabled device 202 to a second SPDM-enabled device 204, the features of the method 400 may be embodied in other specific forms without deviating from the spirit and scope of the present disclosure. For example, the method 400 may perform additional, fewer, or different operations than those described above. For another example, the method 400 may be performed in a sequence of steps different from that described above. As yet another example, certain steps of the method 400 may be performed by other components than those described above, such as by the BIOS configured in the IHS 100.

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

The terms "tangible" and "non-transitory," when used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. An Information Handling System (IHS) comprising:
a first Security Protocol and Data Model (SPDM)-enabled device conforming to a SPDM specification, wherein the first SPDM-enabled device comprises at least one memory coupled to at least one processor, the at least one memory having program instructions stored thereon that, upon execution by the at least one processor, cause the at least one processor to:
receive a request to transmit data to a second SPDM-enabled device;
obtain one or more policies associated with a corresponding one or more transmission criteria of the first SPDM-enabled device relative to the second SPDM-enabled device;
determine whether the data is to be encrypted based upon whether a transmission of the data meets the transmission criteria, wherein the determination is made on a message-by-message basis; and
when the message has a size that is less than a threshold value and is configured within a trust boundary of the first SPDM-enabled device relative to the second SPDM-enabled device, transmit the data unencrypted, otherwise, encrypt the data prior to transmitting the data to the second SPDM-enabled device, the size and the trust boundary comprising the transmission criteria.

2. The IHS of claim 1, wherein the program instructions, upon execution, further cause the IHS to:
obtain a plurality of policies associated with a corresponding plurality of transmission criteria of the first SPDM-enabled device relative to the second SPDM-enabled device; and
determine whether the data is to be encrypted based upon whether a transmission of the data meets a combination of the transmission criteria.

3. The IHS of claim 1, wherein the program instructions, upon execution, further cause the IHS to obtain the plurality of policies from a truth table.

4. The IHS of claim 1, wherein the first SPDM-enabled device comprises a Baseboard Management Controller (BMC) that manages the operation of the second SPDM-enabled device comprising a component of the IHS.

5. The IHS of claim 1, wherein the program instructions, upon execution, further cause the IHS to, prior to transmitting the data to the second SPDM-enabled device, transmit the transmission criteria to the second SPDM-enabled device, wherein the second SPDM-enabled device is configured to process the transmission criteria for receiving the data.

6. The IHS of claim 1, wherein the trust boundary comprises a common motherboard.

7. A dynamic policy assignment method comprising:
receiving, by a first Security Protocol and Data Model (SPDM)-enabled device, a request to transmit data to a second SPDM-enabled device, wherein the first SPDM-enabled device conforms to a SPDM specification;
obtaining, by the first SPDM-enabled device, one or more policies associated with a corresponding one or more transmission criteria of the first SPDM-enabled device relative to the second SPDM-enabled device;
determining, by the first SPDM-enabled device, whether the data is to be encrypted based upon whether a transmission of the data meets the transmission criteria, wherein the determination is made on a message-by-message basis; and
when the message has a size that is less than a threshold value and is configured within a trust boundary of the first SPDM-enabled device relative to the second SPDM-enabled device, transmitting the data unencrypted, otherwise, encrypting the data prior to transmitting the data to the second SPDM-enabled device, the size and the trust boundary comprising the transmission criteria.

8. The dynamic policy assignment method of claim 7, further comprising:
obtaining, by the first SPDM-enabled device, a plurality of policies associated with a corresponding plurality of transmission criteria of the first SPDM-enabled device relative to the second SPDM-enabled device from a truth table; and
determining, by the first SPDM-enabled device, whether the data is to be encrypted based upon whether a transmission of the data meets a combination of the transmission criteria.

9. The dynamic policy assignment method of claim 7, further comprising, prior to transmitting the data to the second SPDM-enabled device, transmitting, by the first SPDM-enabled device, the transmission criteria to the second SPDM-enabled device, wherein the second SPDM-enabled device is configured to process the transmission criteria for receiving the data.

10. The dynamic policy assignment method of claim 7, wherein the trust boundary comprises a common motherboard.

11. A computer program product comprising a non-transitory computer readable storage medium having program instructions stored thereon that, upon execution by an Information Handling System (IHS), cause the IHS to:
receive a request to transmit data to a second SPDM-enabled device;
obtain one or more policies associated with a corresponding one or more transmission criteria of a first Security Protocol and Data Model (SPDM)-enabled device relative to the second SPDM-enabled device, wherein the first SPDM-enabled device conforms to a SPDM specification;
determine whether the data is to be encrypted based upon whether a transmission of the data meets the transmission criteria, wherein the determination is made on a message-by-message basis; and
when the message has a size that is less than a threshold value and is configured within a trust boundary of the first SPDM-enabled device relative to the second SPDM-enabled device, transmit the data unencrypted, otherwise, encrypt the data prior to transmitting the data to the second SPDM-enabled device, the size and the trust boundary comprising the transmission criteria.

12. The computer program product of claim 11, wherein the program instructions, upon execution, further cause the IHS to:

obtain a plurality of policies associated with a corresponding plurality of transmission criteria of the first SPDM-enabled device relative to the second SPDM-enabled device; and determine whether the data is to be encrypted based upon whether a transmission of the data meets a combination of the transmission criteria.

13. The computer program product of claim 11, wherein the data is configured to be organized in the message, wherein the transmission criteria comprises a size of the message.

14. The computer program product of claim 11, wherein the transmission criteria comprises a trust boundary of the first SPDM-enabled device relative to the second SPDM-enabled device, wherein the trust boundary comprises a common motherboard.

\* \* \* \* \*